United States Patent [19]
Breining et al.

[11] Patent Number: 6,142,331
[45] Date of Patent: Nov. 7, 2000

[54] CONTAINER WITH INDICIA COVERING BRIM, BLANK FOR MAKING SUCH A CONTAINER, AND METHODS FOR MAKING THE CONTAINER AND BLANK

[75] Inventors: Michael A. Breining, Neenah, Wis.; Walter Malakhow, Teaneck, N.J.; Anthony N. Curcio, Wint Gap, Pa.

[73] Assignee: Fort James Corporation, Deerfield, Ill.

[21] Appl. No.: 09/413,527

[22] Filed: Oct. 6, 1999

[51] Int. Cl.⁷ ..................................................... B23B 7/06
[52] U.S. Cl. ....................... 220/62.12; 220/658; 229/400; 229/403
[58] Field of Search ................................... 229/400, 403; 220/62.12, 658

[56] References Cited

U.S. PATENT DOCUMENTS

| | | | |
|---|---|---|---|
| 3,739,975 | 6/1973 | Davidow | 229/400 X |
| 3,988,521 | 10/1976 | Fumel et al. | 229/400 |
| 4,435,344 | 3/1984 | Iioka . | |
| 4,518,639 | 5/1985 | Phillips | 229/400 X |
| 4,706,873 | 11/1987 | Schulz | 229/400 |
| 5,007,578 | 4/1991 | Simone | 229/400 |
| 5,697,549 | 12/1997 | Yocum | 229/400 |

Primary Examiner—Steven Pollard
Attorney, Agent, or Firm—Burns, Doane, Swecker & Mathis, L.L.P.

[57] ABSTRACT

A heat-insulating container having an outer surface laminate of foamed thermoplastic synthetic resin such as low density polyethylene is configured to facilitate unwrapping of the container brim so that the container can be used with under-the-brim promotional concepts and the like that require the brim to be unwrapped. The container is fabricated from a body member having an outside surface laminate of foamed polyethylene, and a bottom panel member, with the body member and the bottom panel member being bonded to one another at an interface between a portion of the inside surface of the body member and the upper surface of the bottom panel member. An uppermost region of the body member is curled to form a circumferentially extending brim. A first circumferential portion of the brim being bonded to the outside surface laminate of foamed polyethylene and a second circumferential portion of the brim being unbonded to the outside surface laminate of foamed polyethylene. Indicia is located on the body member and is covered by the second circumferential portion of the brim, with such indicia being uncoverable by unrolling the second circumferential portion of the brim.

26 Claims, 4 Drawing Sheets

CONTAINER WITH INDICIA COVERING BRIM, BLANK FOR MAKING SUCH A CONTAINER, AND METHODS FOR MAKING THE CONTAINER AND BLANK

FIELD OF THE INVENTION

The present invention generally relates to paper containers for holding liquids and other contents. More particularly, the present invention pertains to a heat-insulating paper cup having a curled or wrapped brim in which promotional printing, prize information or other indicia located under the brim of the cup is rendered visible by unrolling the brim.

BACKGROUND OF THE INVENTION

U.S. Pat. No. 4,435,344 discloses a heat-insulating paper container (e.g., a cup) fabricated from paper coated or laminated on its outer surface with a thermoplastic synthetic resin film, preferably a low density polyethylene. In addition, the paper is coated on its inner surface with a thermoplastic synthetic resin film such as a high density polyethylene. Heating the container formed from such a paper causes the low density polyethylene on the outer surface of the container to foam while inner surface of the container remains unformed. Although it has been found that a container having a foamed laminate of low density polyethylene on its outer surface imparts excellent heat-insulating properties to the container, the container is still susceptible of improvements in certain areas.

The container described above is typically produced by cutting out a container body member blank as well as a container bottom panel blank from a paper sheet having one surface coated or laminated with low density polyethylene and the opposite surface coated or laminated with high density polyethylene. The container body member blank is formed into the shape of the container and the container bottom panel blank is secured in place at the bottom of the container body in a known manner. The upper edge of the container body member is then curled or wrapped downwardly and outwardly to form a brim on the container. The upper edge of the container body member is typically curled over through an arc of at least 270° which means that in the finished brim, a portion of the curled upper edge of the container contacts the outer surface of the container sidewall. When the container is then heated to cause the low density polyethylene to foam, the foamed polyethylene bonds the brim of the container to the container sidewall. In some instances, this bonding of the brim to the container sidewall can present difficulties.

For example, proposals have been made to place promotional printing, prize information or other forms of indicia under the curled brim of the container so that the promotional printing, prize information or indicia is concealed. By unrolling or unwrapping the curled container brim, the promotional material, prize information or other indicia can be revealed.

With the heat-insulating container construction described above, because the brim is bonded to the container sidewall by virtue of the foaming action of the low density polyethylene, it can be quite difficult to unroll the curled brim. Thus, these types of containers are not well suited to being used in situations in which promotional printing, prize information or other indicia is concealed under the container brim and is adapted to be revealed and rendered visible by unrolling the brim.

In light of the foregoing, a need exists for a container, such as a container having an outer surface layer of foamed thermoplastic synthetic resin film, that is designed to facilitate the unrolling or unwrapping of the curled brim to reveal indicia located under the container brim.

SUMMARY OF THE INVENTION

In light of the foregoing, one aspect of the present invention pertains to a heat-insulating container having an outer surface laminate of foamed thermoplastic synthetic resin such as low density polyethylene, wherein the container is configured to facilitate unwrapping of the container brim so that the container can be used with under-the-brim promotional materials and the like that require the brim to be unwrapped. The container is fabricated from a body member having an outside surface laminate of foamed polyethylene, and a bottom panel member, with the body member and the bottom panel member being bonded to one another at an interface between a portion of the inside surface of the body member and the upper surface of the bottom panel member. An uppermost region of the body member is curled to form a circumferentially extending brim. A first circumferential portion of the brim being bonded to the outside surface laminate of foamed polyethylene and a second circumferential portion of the brim being unbonded to the outside surface laminate of foamed polyethylene. Indicia is located on the body member and is covered by the second circumferential portion of the brim, with such indicia being uncoverable by unrolling the second circumferential portion of the brim.

According to another aspect of the invention, a container includes a body member and a bottom panel member. The uppermost region of the body member is wrapped around to define a circumferentially extending brim of the container. Indicia is provided on the body member and is covered by one portion of the circumferentially extending brim. The one portion of the circumferentially extending brim possesses a brim length that is shorter than the brim length of an adjoining portion of the circumferentially extending brim to facilitate unrolling the shorter brim length portion of the circumferentially extending brim for purposes of viewing the indicia.

Another aspect of the invention relates to a container body member blank used to produce a container body member which, with a bottom panel member, forms a container having a brim at its upper end. The container body member blank is comprised of a blank of paper having one surface laminate of low density polyethylene which is to form an outer surface of the container main body. The blank possesses oppositely located uppermost and lowermost arcuate edges, and two oppositely positioned and diverging side edges extending between the uppermost and lowermost edges. The uppermost region of the blank adjoining the uppermost edge defines a brim forming region that is adapted to be wrapped to form the brim of the container upon forming the blank into the container body member. The brim forming region is provided with a notched area that is notched inwardly towards the lowermost edge, and indicia is provided on the blank within the brim forming region at a location immediately below the notched area so that when the blank is formed into the container body member with the brim forming region wrapped to form the brim, the indicia is covered by the brim.

A further aspect of the present invention involves a method for producing a container body member blank used to fabricate a container body which, together with a bottom panel member, forms a container having a wrapped brim at its upper end. The method involves punching out a container body member blank from a sheet of paper having a surface laminate of low density polyethylene and indicia on the surface laminate so that the container body member blank includes oppositely located uppermost and lowermost arcuate edges, oppositely located and diverging side edges, and a notched area in the uppermost edge that is notched inwardly towards the lowermost edge at a position immediately adjacent the indicia so that the indicia is covered by the brim of the container when the container body member blank is formed into a container main body and connected to a bottom panel member.

A still further aspect of the invention involves a method for forming a container. The method includes sealing together oppositely located side edge portions of a container body member blank having a surface laminate of low density polyethylene and indicia adjacent one edge to form a container body member in which the surface laminate of low density polyethylene faces outwardly and the indicia is positioned adjacent a circumferentially extending uppermost edge of the container main body. A bottom panel is bonded to the bottom portion of the container main body to form the container. The uppermost edge region of the container body member is curled to form a circumferentially extending brim around the upper end of the container, with a first circumferentially extending portion of the brim being curled to a greater extent than a second circumferentially extending portion of the brim that covers the indicia.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Generally speaking, the present invention provides a container (e.g., a cup) having a brim configured to facilitate unwrapping the brim to expose indicia, such as prize information or promotional printing, located under the container brim. According to a preferred form of the invention, the container brim is shortened or wrapped around to a lesser extent along a region that conceals the indicia so that the brim in this region is spaced from and does not contact the outer surface of the container sidewall. This allows the brim to be more easily unwrapped for purposes of revealing the indicia printed under the brim of the container.

The present invention is particularly useful in connection with containers formed from a body member having an outside surface laminate of foamed thermoplastic synthetic resin such as low density polyethylene. The low density polyethylene coating is foamed by subjecting the container to a heating process. In these types of containers, the brim is formed on the container before the container is subjected to the heating process. When the container is then heated to foam the low density polyethylene laminate, the container brim becomes bonded to the container side wall.

By shortening the container brim or wrapping the brim to a lesser extent along a circumferentially extending region corresponding to the location of indicia printed under the brim, the brim in this region is spaced from the container sidewall and thus does not become bonded to the container sidewall when the low density polyethylene is foamed. Consequently, the unwrapping of the brim in this region is not hindered by being bonded to the foamed polyethylene. Thus, the container of the present invention makes it possible to utilize a heat-insulating container having an outer surface laminate of foamed thermoplastic synthetic resin such as low density polyethylene in conjunction with under-the-brim promotional concepts and the like that require the brim to be unwrapped. The present invention also pertains to a blank used to make such containers as well as methods for making the container and the blank.

Figure 2:
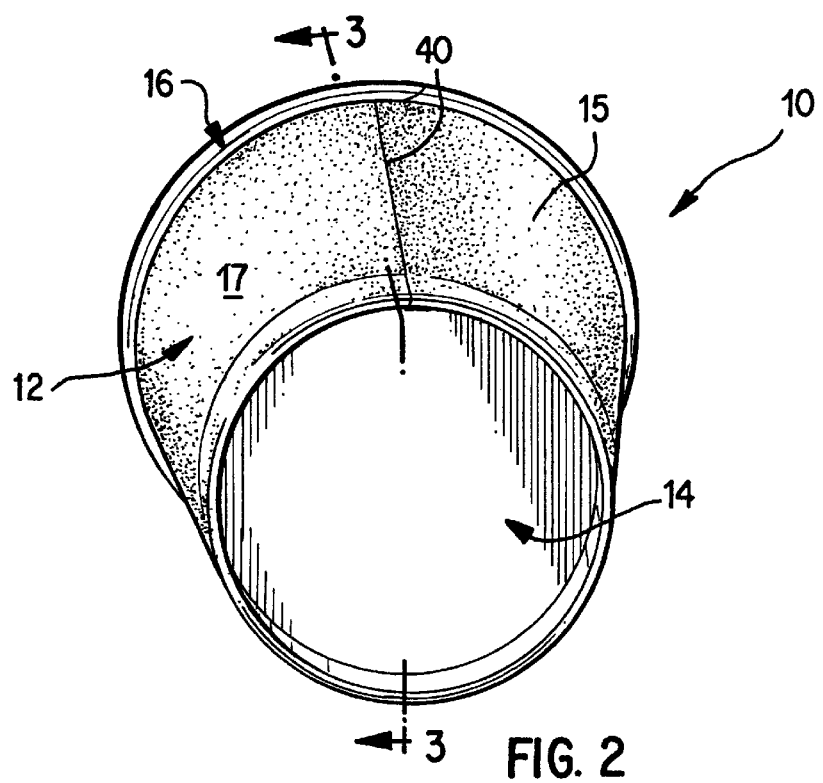
FIG. 2 is a bottom perspective view of the container shown in FIG. 1, but illustrated from the diametrically opposite side of the container.

Considering the present invention in more detail, FIG. 2 illustrates a container in the form of a cup. The container 10 includes a body member 12 and a bottom panel 14. The bottom panel 14 is secured to the lower end of the body member 12 in a known manner by bonding a down-turned peripheral flange of the bottom panel 14 between an up-turned peripheral flange at the bottom of the body member 12 and the inside surface of the container body member 12.

The container body member 12 forms a sidewall 15 of the container that tapers outwardly from the bottom of the container to the top of the container so that the diameter at the bottom of the container is smaller than the diameter at the top of the container. The upper portion of the container body member 12 is curled or wrapped around upon itself to form a wrapped container brim 16. The brim 16 extends circumferentially about the entire upper edge of the container 10.

Figure 4:
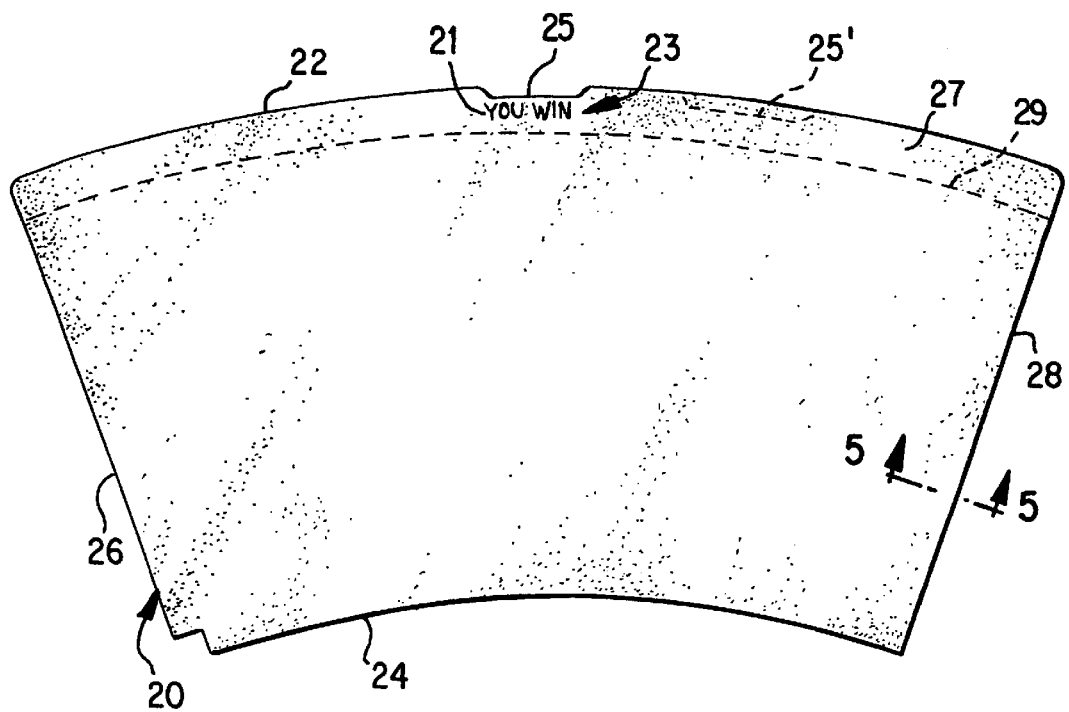
FIG. 4 is a plan view of a container body member blank used to form the container body member of the container shown in FIGS. 1–3.

Before describing additional details associated with the container of the present invention, reference is made to FIG. 4 which illustrates the blank used to form the container body member 12. The container body member blank 20 illustrated in FIG. 4 includes an uppermost edge 22, a lowermost edge 24, and two oppositely positioned straight side edges 26, 28. The uppermost and lowermost edges 22, 24 are curved or arcuate and are substantially parallel to one another. The side edges 26, 28 extend between the oppositely positioned lowermost and uppermost edges 22, 24, and diverge away from one another to form non-parallel sides.

Figure 5:
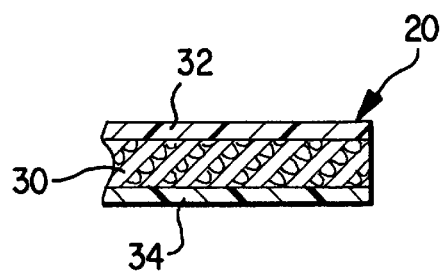
FIG. 5 is a cross-sectional view of a portion of the container body member blank shown in FIG. 4 taken along the section line 5—5.

The material forming the container body member blank 20 is a paper-based material. FIG. 5 depicts, as an enlarged cross-sectional illustration, one form of the paper-based material that can be used to form the container body member blank 20 shown in FIG. 4. The material forming the container body member blank may be of the type described in U.S. Pat. No. 4,435,344, the entire disclosure of which is incorporated herein by reference. As the particular characteristics of the paper-based material used to form the container body member blank 20 are known and described in this patent, they will not be described in detail here. However, a general description will be set forth to facilitate an understanding of one particulary advantageous context in which the present invention can be employed.

The blank can be comprised of a paper sheet 30 laminated on one side with a thermoplastic synthetic resin film 32, preferably a low density polyethylene, that foams when subjected to a heating operation to form a heat-insulating foamed outer surface layer on the container. The laminate or coating of low density polyethylene 32 is positioned on the side of the blank 20 that forms the outer surface of the container when the blank 20 is formed into the container body member 12 shown in FIGS. 1–3. In addition, the opposite side of the paper sheet 30 (i.e., the side that forms the inner surface of the container body member upon formation of the blank into the container main body) is provided with a coating or laminate of thermoplastic synthetic resin film 34, possibly high density polyethylene, that does not foam during such heating operation.

Figure 1:
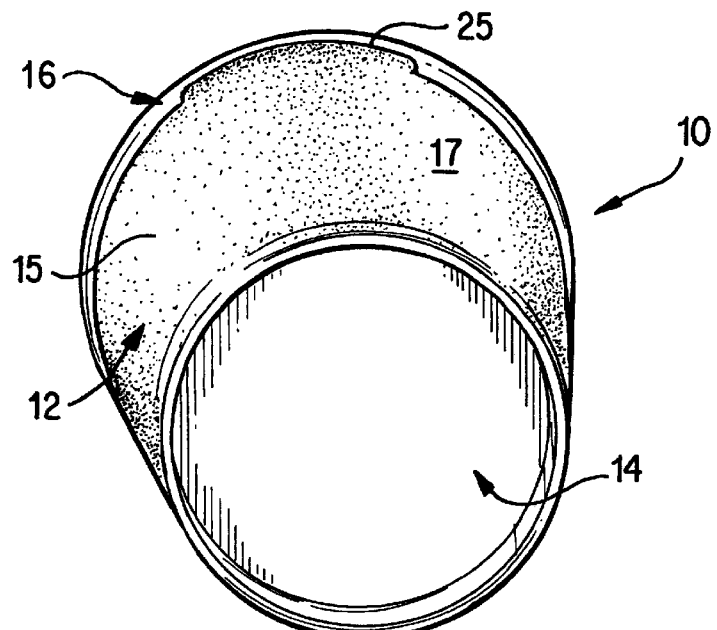
FIG. 1 is a bottom perspective view of a container according to the present invention illustrating the shortened brim region along one circumferentially extending portion of the brim.

When the container body member blank 20 having the construction shown in FIG. 5 is formed into the container body member and, after being joined to a bottom panel member, subsequently heated at a temperature and for a duration as described in the aforementioned U.S. Pat. No. 4,435,344 (e.g., at a temperature of about 240° F. to about 270° F. for a residence time of about 1.5 minutes to about 2.5 minutes in a hot air or electric heat oven), the outer surface laminate of low density polyethylene 32 foams, thus forming a foamed outer surface 17 of low density polyethylene as shown in FIGS. 1 and 2. As also described in the aforementioned U.S. Pat. No. 4,435,344, the inner surface laminate of high density polyethylene 34 ensures that water in the paper 30 will not evaporate directly into the atmosphere when the cup is subjected to the heating operation to effect foaming. The moisture inherently present in the paper sheet 30 serves as the foaming agent for the outer surface layer of polyethylene film 32, and so the laminate 34 on the inner surface provides a seal to prevent evaporation of water through the inside of the cup upon heating and avoid foaming failure of the outer surface polyethylene film 32. The material forming the inner surface laminate 34 is also selected so that it does not foam during the heating operation that is performed to foam the outer surface layer 32. In addition, the inner surface laminate 34 is selected to provide a seal that prevents penetration of liquid contents into the paper sheet 30 during use.

Possible high density polyethylene useful as the inner surface coating or laminate 34 are described in the aforementioned U.S. Pat. No. 4,435,344. However, it is possible to utilize a thermoplastic synthetic resin other than a high density polyethylene on the side of the container body member blank that is to form the inner surface of the container main body. For example, the inner surface coating or laminate 34 can be a modified low density polyethylene film as described in U.S. patent application Ser. No. 08/870,486 filed on Jun. 6, 1997 and U.S. patent application Ser. No. 09/087,956 filed on Jun. 1, 1998, the entire content of both of which is incorporated herein by reference. The use of an inner surface coating or laminate 34 of modified low density polyethylene has been found to be advantageous in providing an extremely effective bond or seal between the container body member and the bottom panel member over a wide variety of different size containers.

Low density polyethylene that have been found to be useful for the outer surface laminate 32 include those polyethylene that have highly branched and widely spaced chains. Such branched chain polyethylene are typically characterized as having densities of about 0.910 to about 0.925 g/$cm^3$, crystallinities of about 50–60%, and melting points ($T_{peak}$) in the range of about 100° C. to about 110° C. (about 212° F. to about 230° F.).

Low density polyethylene can be prepared by conventional methods. For example, such polyethylene can be prepared by polymerization in a free-radical-initiated liquid phase reaction at about 1500 atm (22,000 psi) and about 375° F., with oxygen as a catalyst (usually from peroxides). Vapor phase techniques are also used by polyethylene manufacturers. These use pressures of only about 100 to about 300 psi at less than about 212° F.

A preferred low density polyethylene is PE 4517 sold by Chevron Chemical Company. PE 4517 is a low density polyethylene extrusion coating resin. It has a melt index of 5.0 gms/10 min. (ASTM test method D1238-62T), and a density of 0.923 g/cc (ASTM test method D1505-60T).

Modified low density polyethylene can include the aforementioned low density polyethylene blended with enough non-low density polyethylene, such as high density polyethylene, to prevent laminates of the modified low density polyethylene from foaming when fabricated containers are subjected to the foaming operation. For example, enough high density polyethylene must be present such that a laminate of modified low density polyethylene on the inside surface of the body member of a fabricated container will not foam under conditions of about 240° F. to about 270° F. and a residence time of about 1.5 to about 2.5 minutes, when the container is subjected to the foaming operation in a forced hot-air oven. On the other hand, enough low density polyethylene must be present in the blend such that an effective seal is obtained between the container body member and the bottom panel member. An effective seal is one which provides an improved seal between the bottom panel member and the body member of a cup when fabricated at a speed of at least 165 cups per minute for a 12 ounce cup by a HORAUF MODEL BMP-200 machine, made by Michael Horauf Maschinenfabrik GMBH AND Co KG, with temperature controls set at between about 350° to about 460° C. and a bottom expansion pressure set at about 3000 kilopascals for two revolutions per cup.

Examples of blends suitable to meet the objectives of the invention include those containing approximately 90% low density polyethylene (10% high density polyethylene), and those containing 10% low density polyethylene (90% high density polyethylene). Such blends have been found not to foam under conditions of about 240° F. to about 270° F. and a residence time of about 1.5 to about 2.5 minutes, when the container is subjected to the foaming operation in a forced hot-air oven, yet can exhibit an improved seal in a 12 ounce cup fabricated at a speed of at least about 165 cups per minute by a HORAUF MODEL BMP-200 machine, made by Michael Horauf Maschinenfabrik GMBH AND Co KG, with temperature controls set at between about 350° to about 460° C. and a bottom expansion pressure set at about 3000 kilopascals for two revolutions per cup.

The blends can also contain as little as about 2% to about 7% high density polyethylene, although about 10% high density polyethylene is preferred.

High density polyethylene as used herein include those that have comparatively straight or linear chains which are closely aligned. The physical properties are much different from those of low density polyethylene because of the increased density. Such linear polyethylene are typically characterized as having densities in the range of about 0.941 to about 0.965 g/$cm^3$, crystallinities typically characterized in the range of about 90%, and melting points ($T_{peak}$) in the range of about 128° C. to about 135° C. (about 236° F. to about 275° F.).

High density polyethylene can be prepared by conventional methods such as polymerizing ethylene using Ziegler catalysts at from about 1 to about 100 atm (15 to 1500 psi) at from room temperature to about 200° F.

A preferred high density polyethylene is M3020P, formally "M2004-P", sold by Eastman Chemical Company. M3020P is a high density polyethylene which has a melt index of 9.5 gms/10 min. (ASTM test method D1238), and a density of 0.944 g/cc (ASTM test method D4883). M2004-P is a high density polyethylene which has a melt index of 8.4 gms/10 min. (ASTM test method D1238), and a density of 0.945 g/cc (ASTM test method D4883).

Referring once again to FIG. 4, the uppermost edge 22 of the container body member blank 20 is provided with a notched area 25 that is notched inwardly towards the oppositely located lowermost edge 24. In the embodiment shown in FIG. 4, the notched area 25 is spaced from the side edges 26, 28 of the container body member blank at a position centered along the uppermost edge 22. That is, the center of the notched area 25 as measured along the circumferential extent of the uppermost edge 22 coincides with the center of the uppermost edge 22.

The upper edge portion 27 of the container body member blank 20 that is generally indicated in FIG. 4 as the portion of the blank 20 located above the dotted line 29 is adapted to form the container brim when the blank is formed into the container main body. As can be seen, the notched area 25 extends a portion of the way into the brim forming region 27. In addition, also located within the brim forming region 27 at a position immediately adjoining the notched area 25 is a promotional region 23 at which is located promotional printing, prize information or other forms of indicia 21. This indicia can take any suitable form. For example, the indicia may be associated with a promotion in which prizes of various types are awarded to purchasers purchasing product in the container or cup formed from the blank 20. Positioning the indicia 21 within the brim forming area 27 of the blank 20 ensures that when the blank 20 is converted into a container body member with the upper edge of the body member curled or wrapped around to form the brim, the brim will cover and conceal the indicia 23, thus visually obscuring the indicia 23. On the other hand, upon unwrapping the brim, the indicia 23 will be visible.

Figure 3:
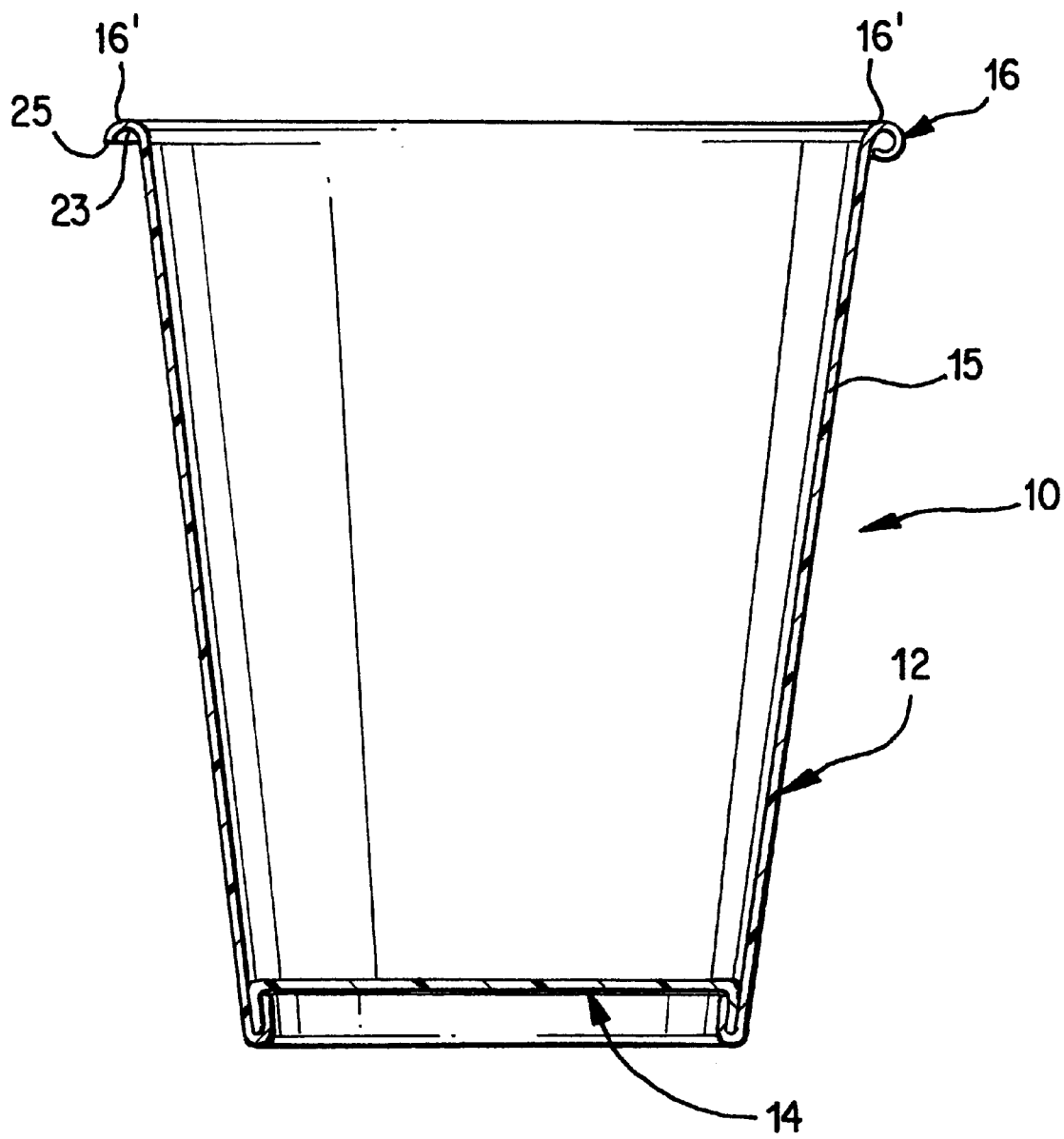
FIG. 3 is a cross-sectional view of the container shown in FIGS. 1 and 2 taken along the section line 3—3 in FIG. 2.

The container body member blank 20 shown in FIG. 4 is converted into the container body member shown in FIGS. 1–3 in the usual manner using known equipment. Generally speaking, the blank 20 is wrapped around a mandrel having a shape generally corresponding to the shape of the container main body. The side edge portions of the blank 20 located adjacent the opposite side edges 26, 28 of the blank 20 are then sealed to one another through, for example, heat fusion to form a sidewall seam 40 of the container body member as shown in FIG. 2. The bottom panel member 14 is then positioned within the bottom portion of the container body member 12 and bonded in place in a known manner. This bottom panel member 14 can have a construction similar to that described in the aforementioned U.S. Pat. No. 4,435,344 or similar to that described in the aforementioned U.S. patent application Ser. No. 08/870,486 and U.S. patent application Ser. No. 09/087,956.

The container body member 12 with the bottom panel member 14 secured in place is then positioned within a receiver and subjected to a brim forming operation in which the upper edge of the container body member 12 (i.e., the brim forming portion 27 shown in FIG. 4) is wrapped or curled around to form the brim. This brim forming operation is accomplished in a known manner through use of, for example, a series of irons, including a pre-curl iron designed to impart an initial amount of curl or wrap to the upper edge portion of the container body member and another curling iron which completes the wrapping or curling of the upper edge portion of the container body member to form the completed brim shown in FIGS. 1–3.

Except for the portion of the brim containing the notched area 25, the brim forming operation results in the brim being wrapped or curled upon itself over an angle of at least 270° as measured from the uppermost edge 16' of the container. On the other hand, in the circumferentially extending portion of the brim corresponding to the notched area 25, the brim is curled or wrapped around to a much lesser extent so that this circumferential portion of the brim is spaced from and does not contact the container sidewall. The brim wrap in this circumferentially extending portion thus forms a region in which the brim is shortened.

The container thus formed is then subjected to a heating operation to effect foaming of the outer surface laminate of low density polyethylene as described above. When the container is subjected to this heating operation, the outer surface low density polyethylene laminate or coating on the container foams to produce a foamed outer surface on the container. This foaming action causes the curled or wrapped around rim 16 of the container, except in the circumferential portion of brim corresponding to the notched area 25, to be bonded to the foamed outer surface of the container sidewall 15. However, as shown in FIGS. 1 and 3, the circumferentially extending shortened brim region corresponding to the location of the notched area 25 does not become bonded to the foamed outer surface of the container sidewall 15. The circumferentially extending shortened brim region is spaced from the foamed outer surface of the container sidewall 15.

This resulting container or cup construction is particularly advantageous from the standpoint of facilitating the unwrapping of the brim to visually expose the promotion area 23 which is covered by and underlies the shortened brim wrap. As described above, appropriate indicia such as promotional printing, prize information or the like is printed in the promotion area 23 and is thus covered by shortened brim region. By providing a shortened brim region in the promotional area 23 that is not sealed to the foamed outer surface of the container sidewall, it is possible to more easily unwrap the brim in the promotional area 23 so that the promotional printing, prize information or other indicia printed in the promotional area 23 can be seen.

As described above in connection with the container body member blank illustrated in FIG. 4, the notched area 25 is centered along the uppermost edge 22 of the blank 20. Thus, when the blank 20 is formed into the container shown in FIGS. 1–3, the notched area 25 defining the shortened brim region is centered at a point diametrically across from the sidewall seam 40 on the container. However, it is to be understood that the notched area 25 forming the shortened brim region can be positioned at other locations along the uppermost edge 22 of the blank 20 so that in the resulting container, the shortened brim region is spaced from a position that is centered diametrically opposite from the sidewall seam 40. FIG. 4 illustrates one example of an alternative location for the notched area 25'.

Preferably, the notched area 25 defining the shortened brim region should be spaced from the sidewall seam 40 of the container. The reason is because it has been found that in the region of the brim adjacent the sidewall seam 40, the brim tends to relax and open up. The bond that occurs between the brim and the foamed sidewall of the container actually contributes to preventing this relaxation and opening up of the brim in the area of the sidewall seam. To avoid negating these advantageous affects associated with having the brim bonded to the foamed sidewall of the container in the area of the seam 40, it is preferable that the shortened brim region be spaced from the sidewall seam 40. This means that the notched area 25 in the blank 20 which defines the shortened brim region should be spaced from the side edges 26, 28 shown in FIG. 4. The notched area 25 should be spaced from the side edges 26, 28 by a distance which, in the finished container, prevents relaxing and opening of the brim.

The notched area 25 defining the shortened brim region should possess a width or circumferential extent sufficient to cover or visually obscure the indicia in the promotion area 23. A preferred width of the notched area is up to 2 inches, as measured along the circumferential extent of the brim, as this has been found to not substantially effect machine runability, although a notched area having a greater width can be used with larger cups.

The depth of the notched area 25 (i.e., the extent to which the notched area 25 is recessed relative to the outermost edge 22 of the blank shown in FIG. 4) defines the degree of brim wrap or curl in the shortened brim region of the container. This dimension should thus be selected to provide a degree of brim wrap ensuring that the indicia 21 in the promotional region 23 is concealed or visually obscured by the shortened brim region upon formation of the container body member blank into the container body member while at the same time ensuring that the brim in the shortened brim region does not intimately contact the container sidewall. The depth of the notched area 25 is selected to provide the appropriate degree of brim wrap. The degree of brim wrap or curl in the shortened brim region (i.e., in the region corresponding to the notched area 25) is less than 270° as measured from the top edge 16' of the brim as shown in FIG. 3. Preferably, the degree of brim wrap or curl in the shortened brim region is between 120° and 240° as measured from the top edge 16' of the brim 16. In contrast, the degree of wrap or curl in the remaining portion of the brim outside the shortened brim region is at least 270° as measured from the top edge 16' of the brim 16, and typically greater than 270°.

Figure 6:
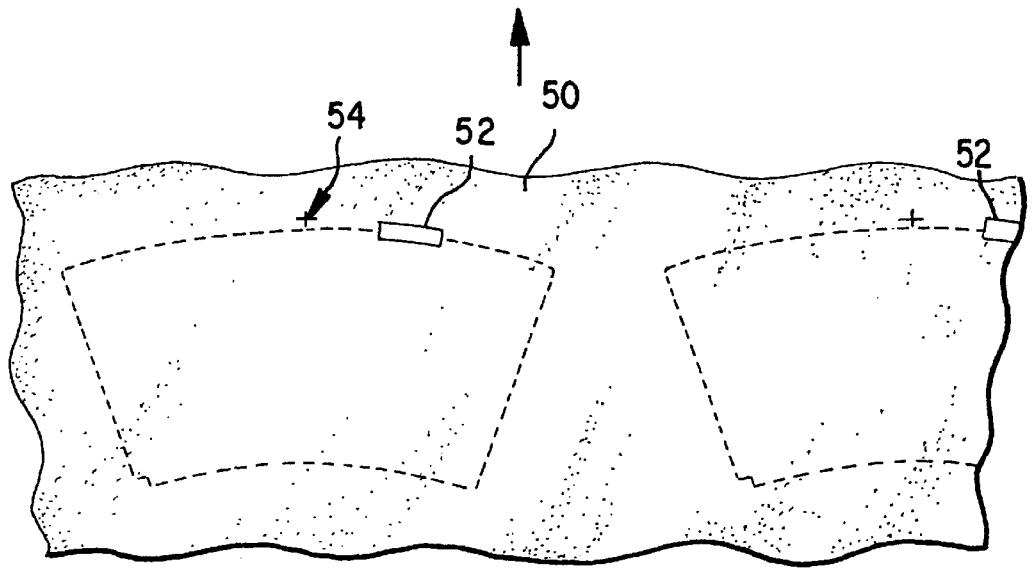
FIG. 6 is a plan view of a paper sheet from which the container body member blank shown in FIG. 4 can be formed according to one fabrication technique.

The container body member blank 20 illustrated in FIG. 4 that is used to form the container body member 12 of the container can be produced in a variety of different ways. In one respect, the blank 20 can be produced using existing machinery so as not to require modification of the machinery. As seen in FIG. 6, this would involve the use of a sheet 50 of paper-based material having the general construction illustrated in FIG. 5 and described above. The sheet is adapted top be conveyed through the blank forming machinery to form successive blanks in the sheet 50. To avoid having to modify the existing machinery, the sheet 50 would be provided with preformed spaced apart cutouts 52 corresponding in location to the location of the notched area 25 in the container body member blank 20. Conveying this paper sheet 50 through the existing blank forming machinery, the machinery would stamp out successive blanks as indicated by the dotted line configurations shown in FIG. 6. By appropriately positioning the cutouts 52 relative to the stamping outline of the blanking die, each stamping outline would pass through one of the cutouts 52 so that the resulting blank would have a notched area corresponding to the notched area 25 in the blank shown in FIG. 4. Utilizing existing machinery in conjunction with the paper sheet 50 shown in FIG. 6 might require that the cutouts 52, and thus the resulting notched area 25 in each blank, be spaced apart from the center of the uppermost edge of the blank. The reason is because existing machinery is sometimes designed to read a printed eyemark located at a place on the sheet corresponding generally to the center of the uppermost edge in the resulting blank. To avoid having to modify the existing machinery, the cutouts areas 52 must thus be shifted to one side of the portion of the sheet corresponding to the center of the uppermost edge in the resulting blank.

Figure 7:
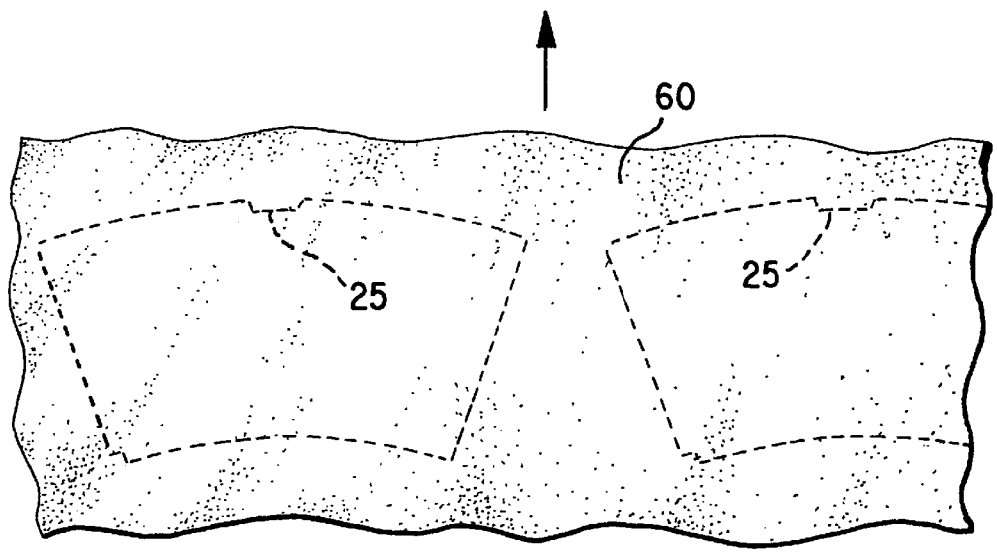
FIG. 7 is a plan view of a paper sheet from which the container body member blank shown in FIG. 4 can be formed according to another fabrication technique.

Another possible way of forming the container body member blank shown in FIG. 4 would be to redesign the stamping die used to form the blank. In this alternative, the stamping die could be slightly modified to have an outline corresponding exactly to the outline of the blank shown in FIG. 4. Thus, as shown in FIG. 7, a sheet of paper 60 having the general construction illustrated in FIG. 5 is conveyed through the modified blank forming machine to stamp out blanks having the configuration illustrated in dotted line representation. With this arrangement, the notched area 25 could be centered on the portion of the paper sheet corresponding to the uppermost edge in the resulting blank, or at any other location, by appropriately configuring the shape of the stamping die.

The present invention advantageously makes it possible to utilize a heatinsulating container having an outer surface laminate of foamed thermoplastic synthetic resin such as low density polyethylene in conjunction with under-the-brim promotional concepts and the like. By configuring the container so that at least one portion of the circumferential extent of the brim is wrapped or curled to a lesser extent than the adjoining portion of the brim, the portion of the brim is spaced from the container sidewall. Using this shortened brim region construction in conjunction with a container having an outer surface laminate of thermoplastic synthetic resin such as low density polyethylene that is adapted to be foamed, the shortened brim region is prevented from being bonded to the foamed outer surface. Consequently, this portion of the brim can be more easily unwrapped than would otherwise be the case. The container of the present invention, including the brim construction, is thus well suited for use with containers designed to be used with promotional concepts and the like in which indicia such as prize information or promotional printing is covered by the brim and adapted to be uncovered by unwrapping the brim. It is envisioned that the brim construction can also be used with other different forms of containers, including those not having a foamed outer surface.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A heat-insulating container fabricated from a body member having an outside surface laminate of foamed polyethylene and an inside surface, and a bottom panel member having an upper surface, said body member and said bottom panel member being bonded to one another at an interface between a portion of the inside surface of the body member and the upper surface of the bottom panel member, an uppermost region of said body member being curled to form a circumferentially extending brim, a first circumferential portion of said brim being bonded to the outside surface laminate of foamed polyethylene and a second circumferential portion of said brim being unbonded to the outside surface laminate of foamed polyethylene, and including indicia on the body member that is covered by said second circumferential portion of said brim and uncoverable by unrolling the second circumferential portion of said brim.

2. The heat-insulating container according to claim 1, wherein said outside surface laminate of foamed polyethylene of the body member is a low density polyethylene.

3. The heat-insulating container according to claim 1, wherein said body member possesses a seam, said second circumferential portion of said brim being centered approximately diametrically across from said seam.

4. The heat-insulating container according to claim 1, wherein said body member possesses a seam, said second circumferential portion of said brim being spaced from the seam.

5. The heat-insulating container according to claim 1, wherein said body member possesses a seam, said second circumferential portion of said brim having a center that is spaced from a position diametrically across from said seam.

6. The heat-insulating container according to claim 1, wherein said first circumferential portion of said brim is wrapped through a first angle of at least 270° as measured from an uppermost edge of said brim and said second circumferential portion of said brim is wrapped through a second angle less than said first angle as measured from an uppermost edge of said brim.

7. The heat-insulating container according to claim 1, wherein said container is a cup.

8. The heat-insulating container according to claim 1, wherein said second circumferential portion of said brim is wrapped through an angle of between about 120° and about 240° as measured from an uppermost edge of said brim.

9. A container comprising a body member and a bottom panel member, an uppermost region of said body member being wrapped around to define a circumferentially extending brim of the container, and including indicia on the body member that is covered by one portion of the circumferentially extending brim, said one portion of the circumferentially extending brim having a length of wrap that is shorter than the length of wrap of an adjoining portion of the circumferentially extending brim to facilitate unrolling said one portion of the circumferentially extending brim for purposes of viewing said indicia.

10. The container according to claim 9, wherein said body member has an outside surface coated with a foamed low density polyethylene.

11. The container according to claim 9, wherein said adjoining portion of the circumferentially extending brim is wrapped through an angle of at least about 270° as measured from an uppermost edge of the brim and said one portion of the circumferentially extending brim is wrapped through an angle less than said adjoining portion as measured from an uppermost edge of said brim.

12. The container according to claim 9, wherein said body member possesses a seam, said one portion of the circumferentially extending brim being centered approximately diametrically across from said seam.

13. The container according to claim 9, wherein said body member possesses a seam, said one portion of the circumferentially extending brim being spaced from the seam.

14. The container according to claim 9, wherein said body member possesses a seam, said one portion of the circumferentially extending brim having a center that is spaced from a point on the brim located diametrically across from said seam.

15. The container according to claim 9, wherein said container is a cup.

16. A container body member blank used to produce a container body member forming, with a bottom panel member, a container having a brim at its upper end, the container body member blank comprising a blank of paper having one surface laminate of low density polyethylene which is to form an outer surface of the container main body, said blank having oppositely located uppermost and lowermost arcuate edges, and two oppositely positioned and diverging side edges extending between the uppermost and lowermost edges, an uppermost region of said blank adjoining said uppermost edge defining a brim forming region that is adapted to be wrapped to form the brim of the container upon forming the blank into the container body member, said brim forming region being provided with a notched area that is notched inwardly towards the lowermost edge, and including indicia provided on said blank within said brim forming region at a location immediately below said notched area so that when said blank is formed into the container body member with the brim forming region wrapped to form the brim, said indicia is covered by the brim.

17. The container body member blank according to claim 16, wherein said notched area is centered on said uppermost edge.

18. The container body member blank according to claim 16, wherein a center of said notched region is spaced from a center of said uppermost edge of said blank.

19. A method for producing a container body member blank used to fabricate a container body which, together with a bottom panel member, forms a container having a wrapped brim at its upper end, comprising punching out a container body member blank from a sheet of paper having a surface laminate of low density polyethylene and indicia on said surface laminate so that said container body member blank includes oppositely located uppermost and lowermost arcuate edges, oppositely located and diverging side edges, and a notched area in the uppermost edge that is notched inwardly towards the lowermost edge at a position immediately adjacent said indicia so that said indicia is covered by the brim of the container when the container body member blank is formed into a container main body and connected to a bottom panel member.

20. The method according to claim 19, wherein said container body member blank is punched out of the sheet of paper so that the notched area is centered on said uppermost edge of the container body member blank.

21. The method according to claim 20, wherein said container body member blank is punched out of the sheet of paper so that a center of the notched area is spaced from a center of said uppermost edge.

22. A method for forming a container comprising:

sealing together oppositely located side edge portions of a container body member blank having a surface laminate of low density polyethylene and indicia adjacent one edge to form a container body member in which the surface laminate of low density polyethylene faces outwardly and the indicia is positioned adjacent a circumferentially extending uppermost edge of the container main body;

bonding a bottom panel to a bottom portion of the container main body to form the container;

curling an uppermost edge region of the container body member to form a circumferentially extending brim around an upper end of the container, a first circumferentially extending portion of the brim being curled to a greater extent than a second circumferentially extending portion of the brim, said second circumferentially extending portion covering said indicia.

23. The method according to claim 22, including heating the container to foam the low density polyethylene so that said first circumferentially extending portion of the brim is bonded to the foamed low density polyethylene while said second circumferentially extending portion of the brim is unbonded to the foamed low density polyethylene.

24. The method according to claim 22, wherein the curled uppermost edge region of the brim in said second circumferentially extending portion of the brim possesses a length less than the length of the curled uppermost edge region of the brim in the first circumferentially extending portion of the brim.

25. The method according to claim 22, wherein said sealing together of the oppositely located side edge portions of the container body member blank produces a seam, said second circumferentially extending portion of said brim being centered approximately diametrically across from said seam.

26. The method according to claim 22, wherein said sealing together of the oppositely located side edge portions of the container body member blank produces a seam, a center of said second circumferentially extending portion of said brim being positioned between the seam and a point located diametrically across from said seam.

\* \* \* \* \*